(12) United States Patent
Hara et al.

(10) Patent No.: US 6,212,942 B1
(45) Date of Patent: Apr. 10, 2001

(54) LEAKAGE INSPECTION METHOD AND APPARATUS

(75) Inventors: Hideaki Hara, Chiryu; Shoji Iriyama, Inazawa, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/172,891

(22) Filed: Oct. 15, 1998

(30) Foreign Application Priority Data

Oct. 21, 1997 (JP) .................................................. 9-288943

(51) Int. Cl.$^7$ ...................................................... G01M 3/08
(52) U.S. Cl. .......................................................... 73/40.5 A
(58) Field of Search .................... 73/40.5 A, 598, 73/592, 40.5 R, 596

(56) References Cited

U.S. PATENT DOCUMENTS

| 3,851,521 | 12/1974 | Ottenstein . |
| 3,852,521 | 12/1974 | Bliss et al. . |
| 4,480,473 | * 11/1984 | Varterasian ............................... 73/596 |
| 4,603,584 | * 8/1986 | Bartle et al. ............................ 73/599 |
| 4,901,576 | * 2/1990 | Rademacher ........................... 73/592 |
| 5,708,195 | * 1/1998 | Kurisu et al. ..................... 73/40.5 R |

FOREIGN PATENT DOCUMENTS

| 0 697 587 A2 | 2/1996 | (EP) . |
| 2164453 | 3/1986 | (GB) . |
| 56-160499 | 12/1981 | (JP) . |
| 59-150320 | 8/1984 | (JP) . |
| 60-97234 | 5/1985 | (JP) . |
| 6-194255 | 7/1994 | (JP) . |
| 7-198526 | 8/1995 | (JP) . |
| WO 80/02734 A1 | 12/1980 | (SU) . |

* cited by examiner

*Primary Examiner*—Hezron Williams
*Assistant Examiner*—Jay L. Politzer
(74) *Attorney, Agent, or Firm*—Harness, Dickey & Pierce, PLC (57) ABSTRACT

A leakage inspection method and apparatus having a pressure wave generating means, including an air supply source, a regulator, and a solenoid valve. A pressure wave of a fluid is applied to a normal flow path of an measurement object by the pressure wave generating means to detect internal leakage by measuring, by means of a microphone, a difference between the transfer time during which the pressure wave passes through the normal flow path and the transfer time during which the pressure wave passes through the leakage flow path. Accordingly, the internal leakage of the fluid, flowing in the leakage flow path bypassing the normal flow path of an equipment having a partition and the normal flow path separated by the partition, is detected, if any.

8 Claims, 7 Drawing Sheets

FIG. 6B INPUT

FIG. 6C OUTPUT

FIG. 10E  AFTER BPF FILTERING

TIME

LEAKAGE INSPECTION METHOD AND APPARATUS

CROSS REFERENCE TO RELATED APPLICATION

This application is based upon and claims priority from Japanese patent application No. Hei 9-288943, filed Oct. 21, 1997, the entire contents of which are incorporated herein by reference.

1. Field of the Invention

The present invention relates to a leakage inspection method and an apparatus for detecting internal leakage of a fluid flowing in a leakage flow path, in equipment having a partition therein and a normal flow path separated by this partition, when the leakage flow path which bypasses the normal flow path is caused. Particularly, the present invention is suitable for an inspection of internal leakage of a heat exchanger such as an evaporator for an air-conditioning apparatus.

2. Description of Related Art

Generally, in equipment having a flow path inside in which a fluid flows, leakage measurements are made by detecting leakage from the inside to the outside of the object (equipment) to be checked, by applying a constant pressure or a constant flow rate of an inspection fluid or a pressure wave to the object. Various kinds of detecting methods, such as a flow rate measuring method, a pressure drop measuring method, etc., are available.

However, in equipment, for instance a heat exchanger like an evaporator, inside of which a partition is formed to separate the equipment interior to define a normal flow path, if a hole exists on the partition, a leakage flow path via the hole would be formed, bypassing the normal flow path and joining the original flow path (normal flow path). In this case, a leakage signal is mixed with a signal of the normal flow path. A conventional method, therefore, is not able to separately detect the leakage signal alone.

SUMMARY OF THE INVENTION

The present invention is made in light of the foregoing problems, and it is an object of the present invention to provide a leakage inspection method and apparatus which detects internal leakage of a fluid flowing in a leakage flow path of an equipment having a partition therein to define a normal flow path, when the leakage flow path bypassing the normal flow path via a hole or the like.

The present inventor et al, taking note of a difference in the length and configuration of the normal flow path and the bypassed leakage flow path, could achieve the above-described object by measuring a transient physical quantity of an inspection fluid or a pressure wave at the outlet when the pressure wave or the inspection fluid is led in from the inlet, then separating the leakage from the normal flow to thereby detect a leakage quantity and a leakage position (position of the leakage flow path).

According to a leakage inspection method of the present invention, a leakage inspection method for detecting an internal leakage of a fluid flowing in a leakage flow path bypassing a normal flow path, having an inlet and an outlet, in an equipment having a partition therein and having the normal flow path separated by the partition, includes the steps of:

applying a pressure wave to the normal flow path from the inlet;

detecting first physical quantity of the pressure wave, which passes through the normal flow path, at the outlet;

detecting second physical quantity of the pressure wave, which passes through the leakage flow path when the internal leakage occurs, at the outlet; and determining the internal leakage from a difference between the first physical quantity and the second physical quantity.

According to the present invention, it is possible to easily detect occurrence of the leakage flow path, that is, internal leakage, by detecting a difference in the physical quantities, caused by a difference in the length and configuration of both flow paths, of the pressure waves passing through the paths.

The physical quantity of the pressure waves may be determined by the transfer time during which the pressure wave passed through each of the flow paths. Accordingly, there occurs a difference in each transfer time according to the difference in the length of flow paths between both flow paths, thereby allowing easy detection of occurrence of internal leakage.

Specifically, it is possible to detect, by using a pressure transducer (pressure sensor or the like), a pressure variation resulting from a difference in the transfer time of the pressure wave between the normal flow path and the leakage flow path.

The detection of the transfer time may be conducted by measuring the pressure wave as a sound wave by means of a microphone, thereby detecting a difference in the transfer time of the sound wave. In this case, the microphone used as a quick-response detecting means capable of measuring a wide dynamic range can detect even a very little quantity of leakage.

According to a leakage inspection apparatus of the present invention, it includes;

pressure wave generating means for applying a pressure wave to the normal flow path from the inlet;

detecting means for detecting first transfer time of the pressure wave, which passes through the normal flow path, at the outlet, and for detecting second transfer time of the pressure wave, which passes through the leakage flow path when the internal leakage occurs, at the outlet; and internal leakage determining means for determining the internal leakage from a difference between the first transfer time and the second transfer time.

Accordingly, it is possible to easily detect occurrence of the leakage flow path, that is, internal leakage, by detecting a difference in the physical quantities, caused by a difference in the length and configuration of both flow paths, of the pressure waves passing through the paths.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Embodiments of the present invention will be described hereinafter with reference to the drawings.

The pressure wave mentioned herein is meant by a wave (pulse wave, sinusoidal wave, etc.) that is transmitted through a medium like a gaseous body such as air, or a liquid such as water, oil and so forth.

[First Embodiment]

The present embodiment utilizes a difference in the transfer time (physical quantity) of a pressure wave, caused by a difference in the length of a normal flow path and a leakage flow path.

Figure 1:
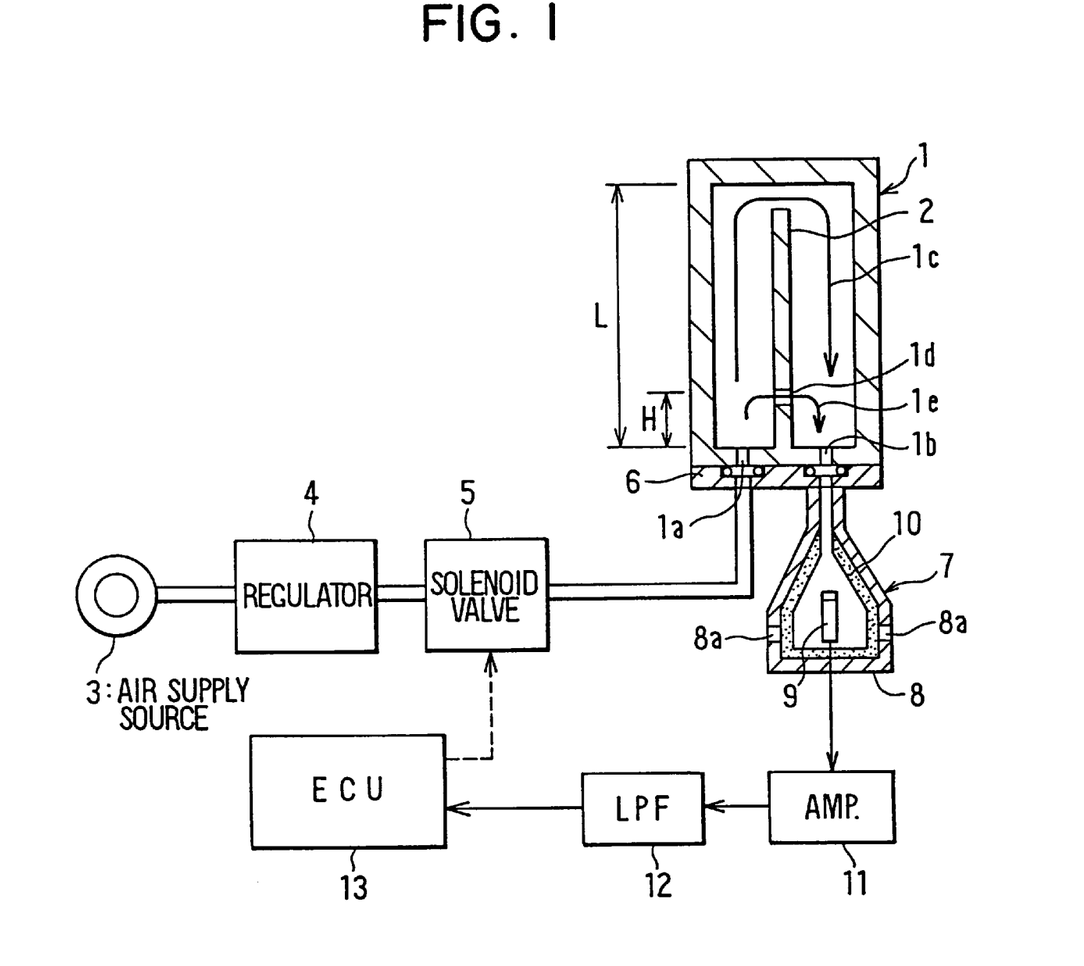
FIG. 1 is a schematic illustration of a first example of a leakage inspection apparatus according to a first embodiment of the present invention.

As shown in FIG. 1, a measurement object 1 for an internal leakage inspection is, for example, an equipment like a heat exchanger (radiator, etc.) in which a fluid flows. The measurement object 1 has an inlet 1a where the fluid flows in and an outlet 1b where the fluid flows out.

A partition 2 is formed inside the measurement object 1, and a normal flow path 1c is defined to allow the flow of the fluid in the measurement object 1. Therefore, the fluid that has entered from the inlet 1a flows through the normal flow path 1c and flows out from the outlet 1b.

The internal leakage of the measurement object 1 is an occurrence of a leaking area 1d such as a hole, crack, etc. on the partition 2, where a leaking flow path 1e is formed. The fluid flowing in the normal flow path 1c is bypassed by the leakage flow path 1e. That is, a part of the fluid that has flowed in the inlet 1a flows to the outlet 1b via the leakage area 1d.

An air supply source 3 for supplying the air pressure supplies an air flow rate required for themeasurements. A regulator 4 maintains a pressure (air pressure) from the air supply source 3 constant. A solenoid valve 5, having a high-speed response, generates a pressure wave (pulse wave in the first example of the first embodiment) having a medium of air. The solenoid valve 5 opens for a certain time to transmit, to the downstream side of the solenoid valve 5, the pressure wave having the regulated pressure set by the regulator 4.

In the first example of the first embodiment, the air supply source 3, the regulator 4, and the solenoid valve 5 form a pressure wave generating means for generating a pressure wave through the air as the medium and applying the pressure wave to the normal flow path 1c of the measurement object 1.

A fixing base 6 secures the measurement object 1. The inlet 1a of the measurement object 1 is connected to the solenoid valve 5 via the fixing base 6. The pressure wave is led from the solenoid valve 5 to the inlet 1a.

A detecting section 7 for detecting a pressure wave coming from the outlet 1b. The detecting section 7 is comprised of a sound-collecting tube 8, a microphone 9, and a sound-absorbing material 10.

The sound collecting tube 8 is attached to the outlet 1b of the measurement object 1 through the fixing base 6, and the microphone 9 is mounted inside. The pressure wave that has come out of the outlet 1b of the measurement object 1 is collected in the sound-collecting tube 8, and is measured by the microphone 9. The inside wall of the sound-collecting tube 8 is lined with the sound-absorbing material 10 to prevent sound reflection. In the lower part of the sound-collecting tube 8, or in the downstream part of the microphone 9, there is provided a hole 8a at which the air is discharged.

An amplifier 11 amplifies an output signal of the sound wave measured by the microphone 9. LPF (low-frequency pass filter) cuts off a high-frequency noise of a signal amplified by the amplifier 12. The signal that has passed the LPF 12 is taken into an electric control unit 13. The control unit 13 has an electric circuit and the like, for processing the signal that has passed through the LPF 12 to decide internal leakage of the measurement object 1, thereby controlling the operation of the solenoid valve 5.

In the first example of the first embodiment, the detecting section 7, the amplifier 11, the LPF 12, and the control unit 13 form a detecting means which detects a difference between a transfer time for a pressure wave passed through the normal flow path 1c and a transfer time for a pressure wave passed through the leakage flow path 1e.

The leakage inspection method for detecting internal leakage of the measurement object 1 by the use of the leakage inspection apparatus of the present embodiment and the operation of the leakage inspection apparatus will be described with reference to FIGS. 2A, 2B, 2C, 3A and 3B.

Figure 2A:
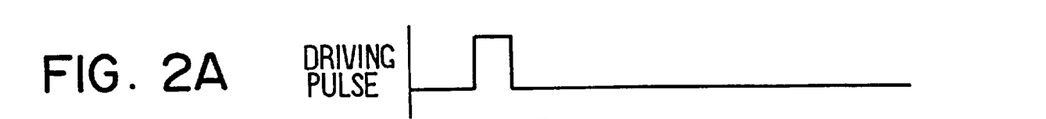
FIG. 2A is an explanatory illustration showing a driving pulse according to the first example of the first embodiment.
Figure 2B:
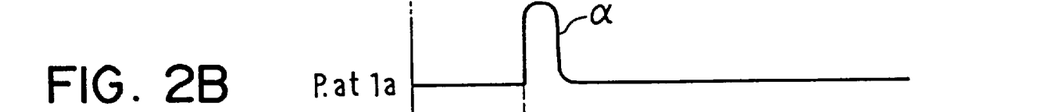
FIG. 2B is an explanatory illustration showing a pressure waveform at an inlet 1$a$ of an object of measurement according to the first example of the first embodiment.
Figure 2C:
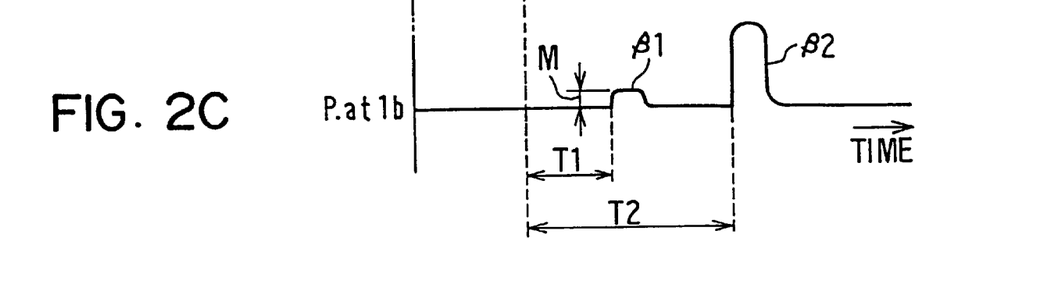
FIG. 2C is an explanatory illustration showing a pressure waveform at an outlet 1$b$ of the object of measurement according to the first example of the first embodiment.

First, when a driving pulse is sent from the control unit 13 to the solenoid valve 5, the solenoid valve 5 opens and closes at a high speed to generate the pressure wave (pulse wave in the first example of the first embodiment). The pressure wave is introduced into the inlet 1*a* as a pressure wave α at the same speed as the sound velocity. When there is no internal leakage, the pressure wave α passes through the normal flow path 1*c*, and comes out from the outlet 1*b* after the time (transfer time) T2 that is obtained by multiplying the flow path length 2L of the normal flow path 1*c* by the sound velocity.

When there is the fluid leaks in the measurement object 1, a part of the pressure wave α passes the leaking area 1*d* along the leakage flow path 1*e*, thus bypassing the normal flow path 1*c*, while the other part of the pressure wave α passes through the normal flow path 1*c* as described above. The H is a distance from the inlet 1*a* to the leaking area 1*d* (or from the outlet 1*b* to the leaking area 1*d*). The pressure wave passing through the leaking flow path 1*e* comes out from the outlet 1*b* after the time (transfer time) T1, that is obtained by multiplying the flow path length 2H of the leaking flow path 1*e* by the sound velocity.

Since the distance H is shorter than the distance L, the relationship between both transfer times is T1<T2. Therefore, a pressure wave β1 caused by leakage (hereinafter referred to as the pressure wave β1) that has passed through the leakage flow path 1*e* reaches the outlet 1*b* before the pressure wave β2 (hereinafter referred to as the pressure wave β2) that has passed through the normal flow path 1*c* reaches the outlet 1*b*. Thus, the pressure wave β1 is measured by the microphone 9 at the detecting section 7.

It is, therefore, possible to separate the pressure waves β1 and β2 that have come out at the outlet 1*b*, thereby enabling to detect only the pressure wave β1 to determine the internal leakage.

A position of the leaking area 1*d* (hereinafter referred to as the leakage position), in other words, the flow path length 2H of the leaking flow path 1*e* can be obtained from a relationship between the above-described transfer time T1 and the flow path length 2H of the leakage flow path 1*e*. According to investigations by the inventors herein, it was found that the wave height M of the pressure wave β1 is proportional to the quantity of leakage at the leaking area 1*d* (hereinafter referred to as the leakage quantity). Therefore it is possible to obtain the leakage quantity and the leakage position of the internal leakage from the wave height M and transfer time T1 of the pressure wave β1.

Figure 3A:
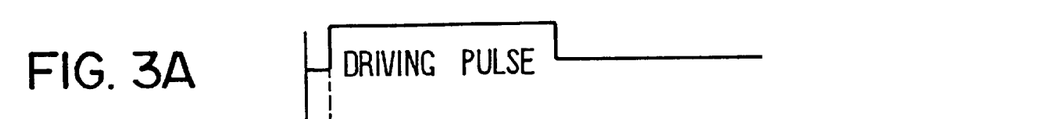
FIG. 3A is an explanatory illustration showing a driving pulse according to the first example of the first embodiment.
Figure 3B:
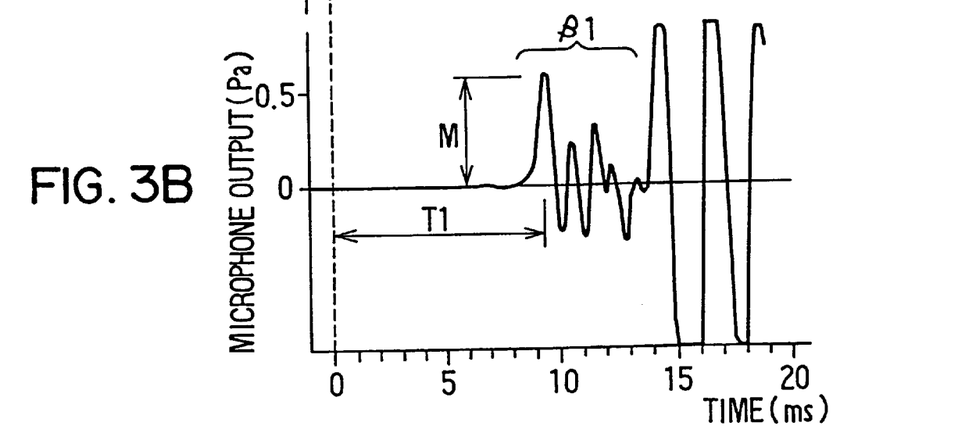
FIG. 3B is a graph showing an output waveform of a microphone according to the first example of the first embodiment.

FIG. 3B shows one example of a time variation of the output waveform (output signal) of the microphone 9 obtained by measuring the pressure wave β1 at the outlet 1*b* and plotting the output signals on the vertical axis (microphone output, Pa) and the time on the horizontal axis (ms).

In FIG. 3B, the measured pressure wave β1 includes a plurality of small peaks. Among these peaks, a peak that appears first has the wave height M (amplitude peak value), and a position of the first peak (peak time) takes transfer time T1.

Figure 4:
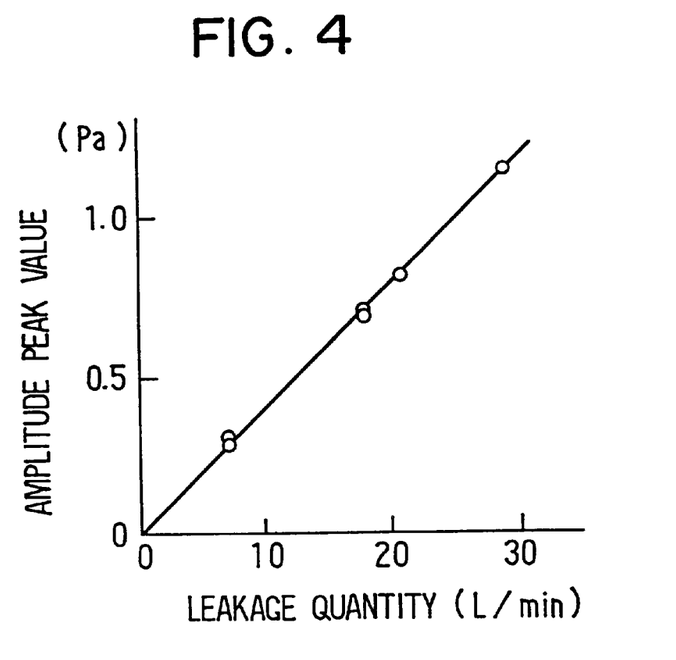
FIG. 4 is a graph showing a relationship between leakage quantity and amplitude peak value according to the first example of the first embodiment.
Figure 5:
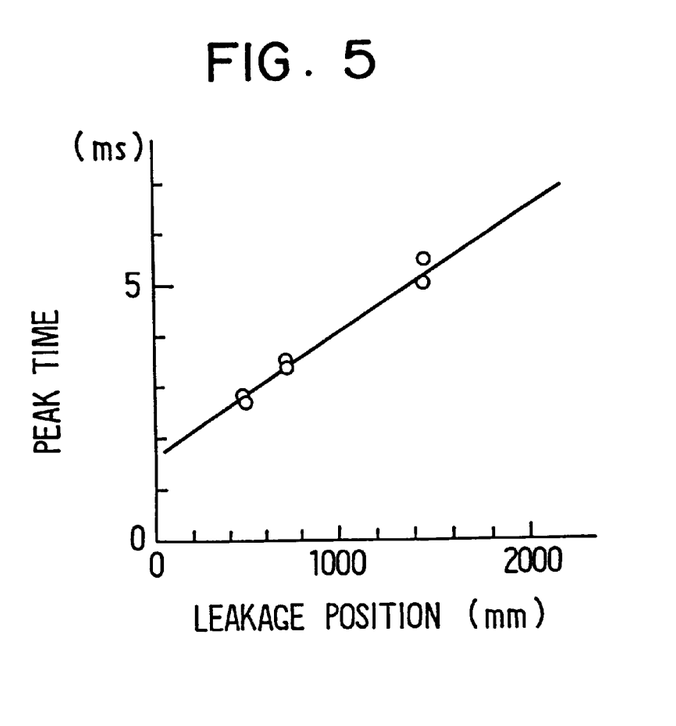
FIG. 5 is a graph showing a relationship between leakage position and peak time in the first example according to the first example of the first embodiment.

Similarly to FIG. 3B, results of measurements and investigations for various output waveforms are shown in FIG. 4 and FIG. 5. FIG. 4 is a graph showing a relationship between the leakage quantity and the wave height M (amplitude peak value) of the pressure wave β1, in which the leakage quantity (liter/min) is plotted on the horizontal axis and the amplitude peak value (Pa) is plotted on the vertical axis. FIG. 5 is a graph showing a relationship between the leakage position (the flow path length 2H of the leakage flow path 1*e*) and the transfer time T1 (peak time) of the pressure wave β1, in which the leakage position (mm) is plotted on the horizontal axis and the peak time (ms) is plotted on the vertical axis. As shown in these graphs, the wave height M is proportionate to the leakage quantity and the transfer time T1 is proportionate to the leakage position.

In the first example mentioned above, the pressure wave measurement was made by the use of the microphone 9. The means for measuring the pressure wave may be a pressure sensor in general use. For instance, the pressure wave can be measured by a pressure sensor mounted at the outlet 1*b* of the measurement object 1. The microphone 9, which responds quickly within a wide dynamic range of measurement, can detect even a very little leakage as compared with the pressure sensor in general use.

Figure 6A:
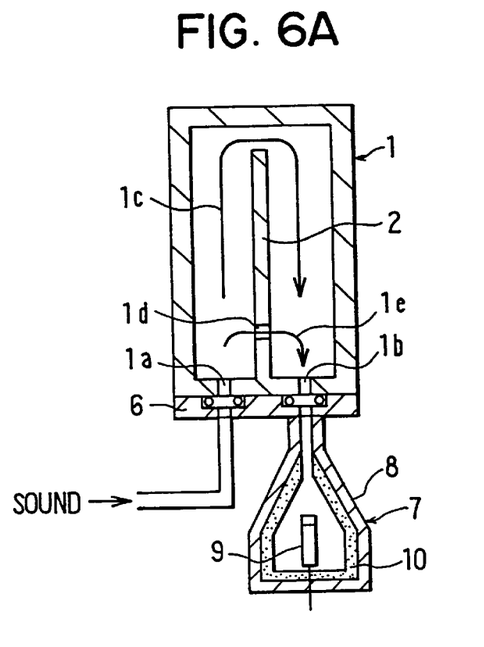
FIG. 6A is a schematic illustration showing a part of a leakage inspection apparatus according to a second example of the first embodiment of the present invention.
Figure 6B:
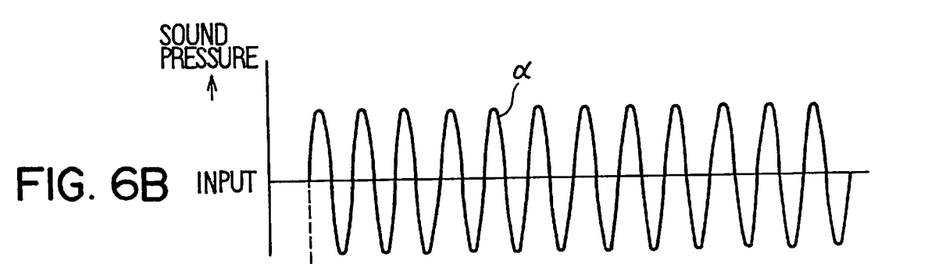
FIG. 6B is an explanatory illustration showing an input pressure waveform of sound pressure according to the second example of the first embodiment.
Figure 6C:
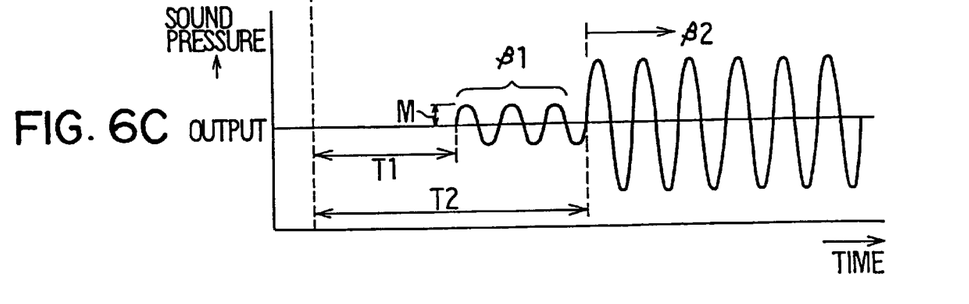
FIG. 6C is an explanatory illustration showing an output pressure waveform of sound pressure according to the second example of the first embodiment.

A second example of the first embodiment is shown in FIGS. 6A, 6B and 6C. This example also utilizes the transfer time of the pressure wave. In the first example of the first embodiment, the pulse wave as the pressure wave α is generated by the pressure wave generating means. The second example of the first embodiment, however, is different from the first example because the pressure wave α is a sound (sound wave) having a waveform of a constant sound pressure. In the second example and the following embodiments, components which are substantially the same as those in previous embodiments are assigned the same reference numerals.

The leakage inspection apparatus in the second example of the first embodiment has, as a pressure wave generating means, a sound (sound wave) generating means (not shown) which comprises a waveform generator, a speaker, and the like and generates a sound (sound wave) having a waveform of a constant sound pressure.

FIGS. 6B and 6C show a time variation of the input and output waveforms of the pressure wave in the leakage inspection, that is, each waveform of the pressure wave α (input) and the pressure waves β1 and β2 (output). As illustrated, the sound having a waveform of a constant sound pressure is inputted into the inlet 1*a*, and the sound outputted from the outlet 1*b* is measured by the microphone 9 and outputted, as the pressure waves β1 and β2 outputted from the outlet 1*b*. Similarly to the first example, the pressure wave β1 is measured chronologically before the pressure wave β2.

In the second example of the first embodiment, therefore, the pressure waves β1 and β2 that have come out at the outlet 1*b* of the measurement object 1 are separated to allow the detection of the pressure wave β1 alone to thereby discriminate internal leakage. Furthermore, the leakage quantity and leakage position can be found from the wave height M and transfer time T1 of the pressure wave β1 thus measured.

According to the first embodiment, as described above, the physical quantities of the pressure wave that has passed the normal flow path 1*c* and the pressure wave that has passed the leakage flow path 1*e* at the time of the occurrence of the leakage flow path 1*e* are determined to be the transfer times during which the pressure waves passed each of the flow paths 1*c* and 1*e*, respectively.

Since a difference exists between the transfer time T2 (for the pressure wave β2 to pass the normal flow path 1*c*) and the transfer time T1 (for the pressure wave β1 to pass the leakage flow path 1*e*), it is possible to detect the internal leakage (leakage quantity and leakage position) by detecting a pressure fluctuation.

Since the leakage quantity and leakage position can be detected, it is advantageous for leakage repair for a heat exchanger (radiator, etc.) and the like.

[Second Embodiment]

The second embodiment of the present invention uses an inspection fluid (air) in place of the pressure wave used in the first embodiment. The second embodiment detects the difference in the transfer time (physical quantity) of the inspection fluid resulting from the difference in the flow path length of the normal flow path 1c and the leakage flow path 1e by detecting flow rate fluctuation of the inspection fluid.

Figure 7A:
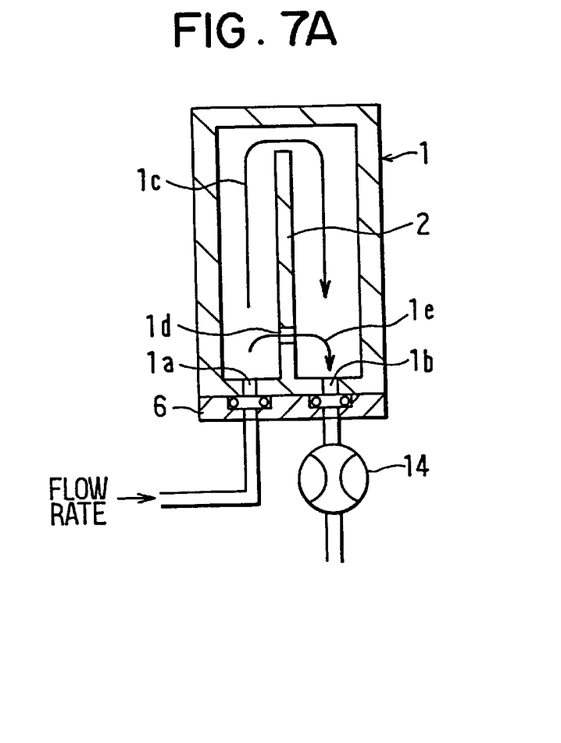
FIG. 7A is a schematic illustration showing a part of a leakage inspection apparatus according to a second embodiment of the present invention.
Figure 7B:
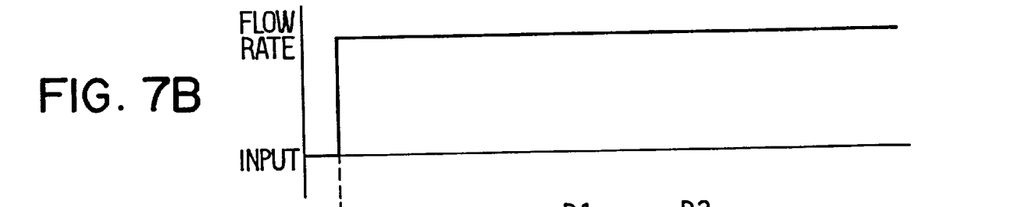
FIG. 7B is an explanatory illustration showing an input waveform of flow rate according to the second embodiment.
Figure 7C:
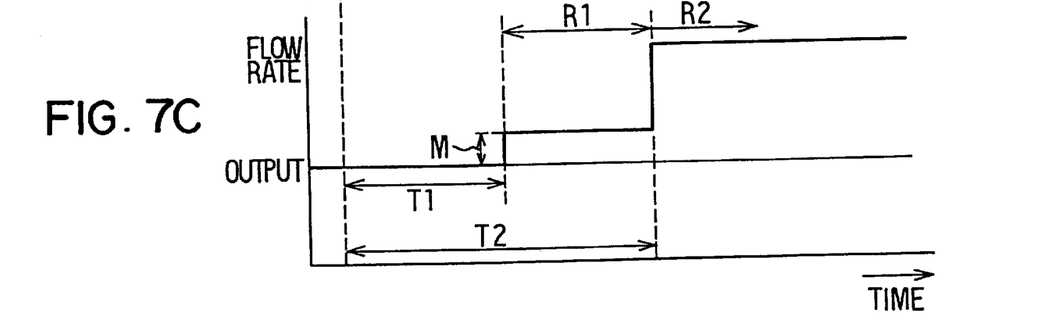
FIG. 7C is an explanatory illustration showing an output waveform of flow rate according to the second embodiment.

FIG. 7A shows a major portion of the leakage inspection apparatus of the second embodiment, and FIGS. 7B and 7C show input and output waveforms of the flow rate of the inspection fluid. In other words, FIG. 7B shows a flow rate fluctuation (input) of the inspection fluid that has been inputted into the inlet 1a of the measurement object 1, and FIG. 7C shows a flow rate fluctuation (output) of the inspection fluid that is outputted from the outlet 1b, as a waveform.

In the leakage inspection apparatus according to the second embodiment, the air supply source 3, the regulator 4 and the solenoid valve 5 which form the pressure wave generating means in the first example of the first embodiment, constitute the fluid inflow means which allows the air as the inspection fluid into the normal flow path 1c from the inlet 1a of the measurement object 1.

A flow meter 14 for measuring the flow rate of the inspection fluid outputted from the outlet 1b is mounted at the outlet 1b of the measurement object 1, in place of the detecting section 7, amplifier 11 and LPF 12 in the first example of the first embodiment. The control unit 13 receives the flow rate measured at the flow meter 14 as a signal (output signal), and processes the signal, and controls the operation of the solenoid valve 5.

According to the second embodiment, the flow meter 14 and the control unit 13 comprise the detecting means for detecting internal leakage of the measurement object 1 by detecting a difference between the transfer time for the inspection fluid (air) to pass the normal flow path 1c and the transfer time for the inspection fluid to pass the leakage flow path 1e.

As indicated by the input waveform in FIG. 7B, the inspection fluid (air) with a constant flow rate is entered into the inlet 1a of the measurement object 1 by controlling the regulator 4 and the solenoid valve 5. Then, similarly to the pressure wave in the first embodiment, the inspection fluid passes the leakage flow path 1e chronologically before the normal flow path 1c due to the difference in the length of the flow paths 1c and 1e.

Therefore, as indicated by the output waveform of flow rate of the inspection fluid at the output 1b in FIG. 7C, the inspection fluid that has passed the leakage flow path 1e is detected as a flow rate R1 first, and thereafter the inspection fluid that has passed the normal flow path 1c is detected as the flow rate R2.

The flow rates R1 and R2 of the fluid that are outputted from the outlet 1b of the measurement object 1 can be separated, and it is possible to detect the flow rate R1 to determine the occurrence of the internal leakage. Furthermore, it is possible to find the leakage quantity and leakage position from the wave height M of the waveform at the flow rate R1 and the transfer time T1 at the appearance of the waveform at the flow rate R1.

According to the second embodiment, since there is a difference, which results from a difference in the flow path length, between the transfer time T2 and the transfer time T1, the detection of internal leakage (leakage quantity and leakage position) can be made by detecting a flow rate variation of the inspection fluid, thus easily finding the internal leakage.

Furthermore since the leakage quantity and the leakage position can be detected, the leakage inspection method and apparatus according to the present embodiment is advantageous for leakage repair and the like for a heat exchanger or the like (radiator, etc.).

[Third Embodiment]

A waveform deformation and interference of the pressure wave, caused by differences in the configuration and the like of the flowpaths 1c and 1e, cause a difference in each transfer frequency (physical quantity) of the pressure waves that pass the flow paths 1c and 1e. This phenomena is utilized in a third embodiment of the present invention.

Figure 8:
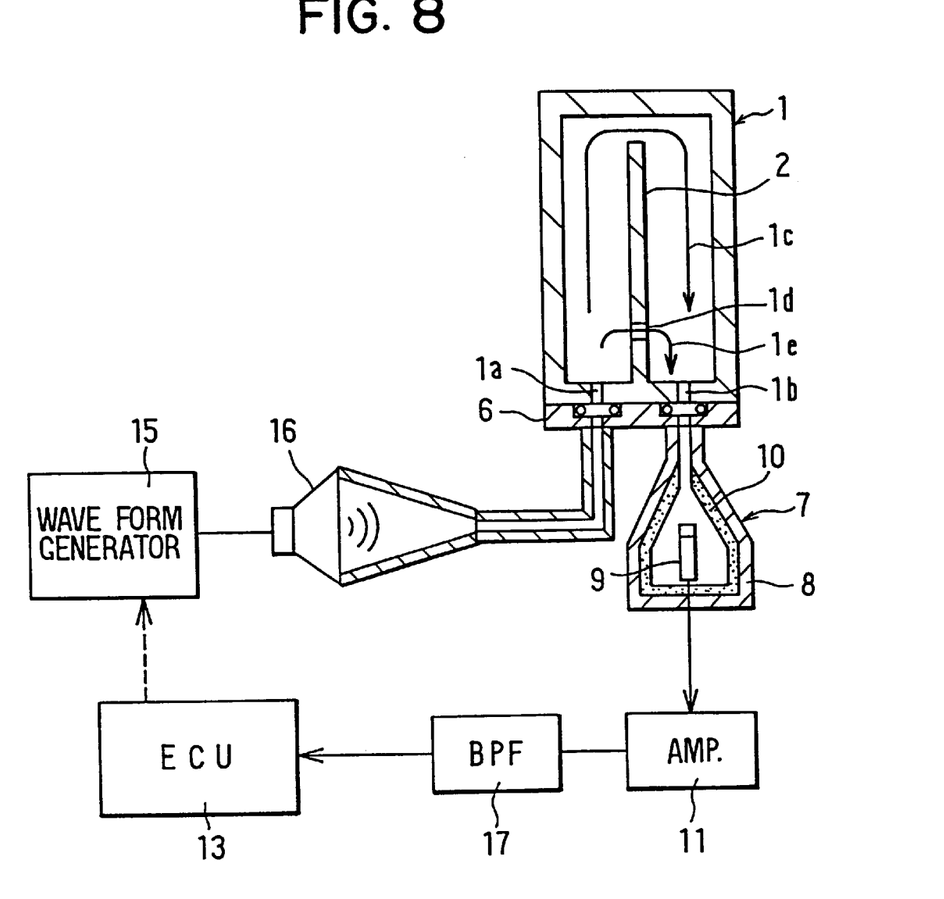
FIG. 8 is a schematic illustration showing a leakage inspection apparatus according to a third embodiment of the present invention.

In FIG. 8, an output of a waveform generator 15 is connected to a speaker 16. The pressure wave (sound wave) generated by the speaker 16 is introduced into the normal flow path 1c from the inlet 1a of the measurement object 1 via the fixing base 6.

In the third embodiment of the present invention, the waveform generator 15 and the speaker 16 comprise the pressure wave generating means which applies a pressure wave to the normal flow path 1c. The detecting section 7, which is similar to the first embodiment, is mounted on the outlet 1b of the measurement object 1.

Only a frequency of a sound wave, which has passed the leakage flow path 1e among signals (waveform signals) that have passed the microphone 9 and amplifier 11 in the detecting section 7, can pass a filter 17 (band-pass filter (BPF)) and is sent to the control unit 13. In the second embodiment, the control unit 13 also controls the waveform generator 15. The detecting section 7, amplifier 11, filter 17, and control unit 13 comprise a detecting means for detecting a transfer frequency difference between the pressure wave that has passed the normal flow path 1c and the pressure wave that has passed the leakage flow path 1e when the leakage flow path 1e is generated.

Figure 9:
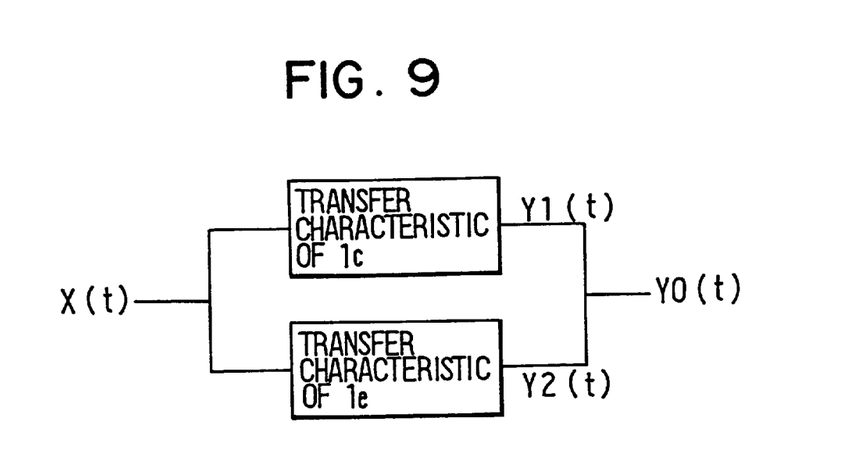
FIG. 9 is an explanatory view showing transfer characteristics of the pressure wave in a normal flow path and a leakage flow path according to the third embodiment.

Next, the leakage inspection method for detecting internal leakage of the measurement object 1 by using the leakage inspection apparatus of the present embodiment, and operation of the leakage inspection apparatus, will be described with reference to FIGS. 9, 10A, 10B, 10C, 10D, and 10E. FIG. 9 explains the transfer characteristics of a pressure wave (waveform deformation and interference of the pressure wave) flowing through the normal flow path 1c and the leakage flow path 1e.

When the internal leakage occurs, the leakage flow path 1e is produced besides the normal flow path 1c. The pressure wave X(t) having a certain physical quantity is inputted at the inlet 1a of the measurement object 1. Each of the flow paths 1c and 1e has different transfer characteristics caused by a difference in the flow path configuration. Therefore, the physical quantity of the pressure wave X(t) is converted by each transfer characteristics.

Y1(t) represents a pressure wave that has passed the normal flow path 1c, and Y2(t) represents a pressure wave that has passed the leakage flow path 1e, and Y0(t) represents a pressure wave that has been outputted from the outlet 1b. The physical quantity of the pressure wave Y0(t) at the outlet 1b 1 is the sum of the pressure waves Y1(t) and Y2(t).

In the third embodiment of the present invention, since the transfer frequency (passing frequency) as the physical quantity of the pressure wave differs with the transfer characteristics of the flow paths 1c and 1e through which the pressure wave passes, internal leakage detection is conducted by utilizing the difference in the transfer frequency. Because of the difference in the flow path configuration (flow path surface area or the like), the normal flow path 1c has the transfer characteristics allowing the passage of only the pressure wave Y1(t) having certain low transfer frequency, and the leakage flow path 1e has the transfer characteristics allowing the passage of only the pressure wave Y2(t) having certain high transfer frequency.

Above described pressure waves X(t), Y1(t), Y2(t), and Y0(t) are shown in FIGS. 10A, 10B, 10C and 10D, respectively, using a sound as the pressure wave and with the time t plotted on the horizontal axis.

Figure 10A:
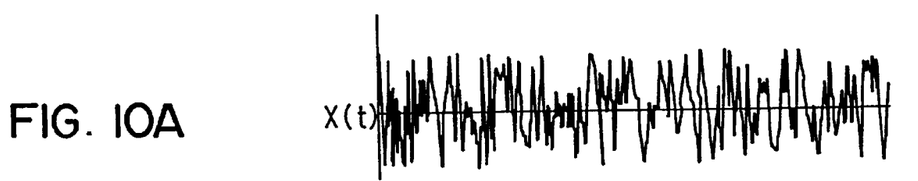
FIG. 10A is a schematic illustration showing an input waveform of a pressure wave X(t) according to the third embodiment.

Using a sound produced by the speaker 16 as an input waveform, a sound including the transfer frequencies of both flow paths 1c an 1e, or a sound including many transfer frequencies (input X(t) in FIG. 10A), is introduced from the inlet 1a into the normal flow path 1c of the measurement object 1.

Figure 10B:
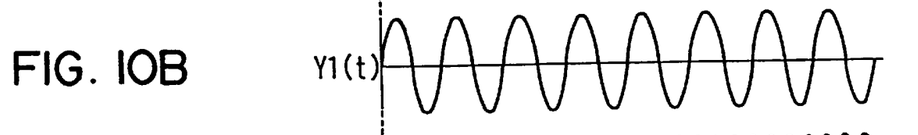
FIG. 10B is a schematic illustration showing a waveform of a pressure wave Y1(t) according to the third embodiment.
Figure 10C:
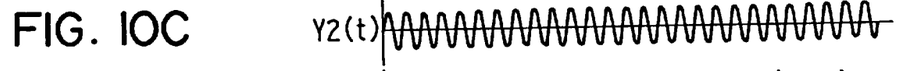
FIG. 10C is a schematic illustration showing a waveform of a pressure wave Y2(t) according to the third embodiment.
Figure 10D:
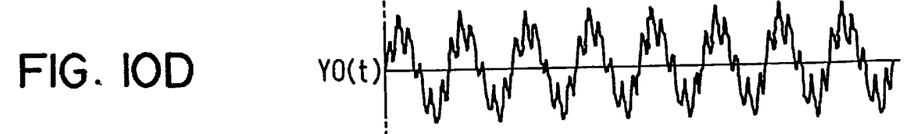
FIG. 10D is a schematic illustration showing an output waveform of a pressure wave Y0(t) according to the third embodiment.

Then, the sound (Y1(t) in FIG. 10B) that has passed the normal flow path 1c becomes a sound having certain low transfer frequency alone, while the sound (Y2(t) in FIG. 10C that has passed the leakage flow path 1e becomes a sound with certain high transfer frequency alone. At the outlet 1b of the measurement object 1, a sound (Y0(t) in FIG. 10D), made by mixing the sound Y1(t) with the sound Y2(t), is outputted.

Figure 10E:
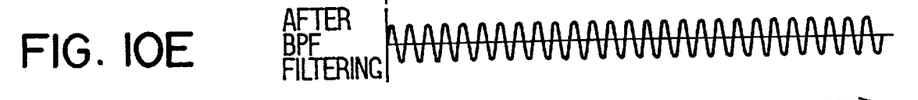
FIG. 10E is a schematic illustration showing a waveform of a pressure wave after passing through BPF according to the third embodiment.

The sound Y0(t) measured by the microphone 9 passes through the filter 17, then going into the control unit 13. The filter (BPF) 17 allows the passage of only the frequency of the sound wave that has passed the leakage flow path 1e, and therefore only the sound Y2(t) is taken into the control unit 13 as shown in FIG. 10E.

Therefore, the sound Y1(t) and y2(t) that has passed through the flow paths 1c and 1e can be separated, so that only the sound Y2(t) can be detected to determine the internal leakage. Since the volume of sound passing through the leaking area 1d is proportional to the leakage quantity, the leakage quantity can be found from the sound volume measured at the control unit 13.

In the present embodiment, as described above, a difference occurs in the transfer frequency of the pressure wave (e.g., sound) that has passed through the flow paths 1c and 1e, because of the waveform variation and interference of the pressure wave resulting from a difference in the flow path configuration. Utilizing this difference in the transfer frequency, the leakage inspection apparatus can detect internal leakage (leakage quantity), thus conducting easy detection of the internal leakage.

Each of the embodiments can easily be known as described above. For example, applying the above-described embodiments to a multilayer heat exchanger (in which the state of occurrence of internal leakage can not be distinguished from the normal state of communication through the fluid passage of the heat exchanger because the inlet side and the outlet side are communicated through the fluid passage of the heat exchanger) in which the fluid inlet passage and fluid outlet passage are formed in a single end plate itself makes it possible to reliably detect a desirable heat exchange performance.

It is conceivable to detect each physical quantity of the pressure wave or the inspection fluid that has passed through the flow paths 1c and 1e by the use of separate detecting means. However, according to the above described embodiments, the physical quantity can be detected by utilizing a difference in the flow path length and configuration of the flow paths 1c and 1e simply by providing one detecting means in the outlet 1b of the measurement object 1. The leakage inspection apparatus, therefore, can be made simple in structure.

OTHER MODIFICATIONS

In the first and third embodiments, not only the air but other gaseous body or liquid may be used as a medium to provide the pressure wave. Also in the second embodiment, the inspection fluid may be other gaseous body than the air, and a liquid such as water, oil.

Furthermore, when using the pressure wave, both the transfer time in the first embodiment and the transfer frequency in the second embodiment may be detected as physical quantities.

Furthermore, when the inspection fluid is used, the transfer time may be detected by detecting both variations, that is, the flow rate variation and the pulse pressure variation (fluid pressure variation) arising in the fluid as in the second embodiment.

It should be noticed that in each of the present embodiments, the object of measurements is not limited to the heat exchanger (radiator, etc.), and may be any such equipment provided with a partition inside and having a normal flow path separated by this partition. The embodiment is applicable as the leakage inspection method and apparatus for detecting internal leakage of the fluid passing a leakage flow path when, in such equipment, there has occurred the leakage flow path bypassing the normal flow path on the way of the normal flow path.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A leakage inspection method for detecting an internal leakage of a fluid flowing in an apparatus having a normal flow path defined by a plurality of sections, said leakage inspection method detectng the internal leakage in a deviated flow path from a section on the upstream side to a section on the downstream side of the normal flow path, said normal flow path having an inlet and an outlet, said method comprising the steps of:

applying a pressure wave from said inlet to said normal flow path and said deviated flow path when said internal leakage occurs;

detecting a first physical quantity of said pressure wave passing through said normal flow path within said apparatus, at said outlet;

detecting a second physical quantity of said pressure wave passing through said deviated flow path within said apparatus when said internal leakage occurs, at said outlet; and determining a quantity of said internal leakage from a difference between said first physical quantity and said second physical quantity.

2. A leakage inspection method according to claim 1, further comprising the steps of:

measuring a transfer time for said pressure wave passing through said normal flow path; and measuring a transfer time for said pressure wave passing through said deviated flow path.

3. A leakage inspection method according to claim 2, wherein:

said pressure wave includes a sound wave; and said sound wave is detected by a microphone at said outlet.

4. A leakage inspection method according to claim 3, wherein said steps of detecting first and second physical quantity includes means for detecting an amplitude of said pressure wave, said quantity of internal leakage being determined from a wave height of said sound wave passing through said leakage flow path.

5. A leakage inspection method according to claim 3, further comprising a step of determining a leakage position of said internal leakage from said transfer time of said sound wave for said leakage flow path.

6. A leakage inspection method according to claim 2, wherein said steps of detecting a first and second physical quantity includes means for detecting an amplitude of said pressure wave, said quantity of internal leakage being determined from a wave height of said pressure wave passing through said leakage flow path.

7. A leakage inspection method according to claim 2, further comprising a step of determining a leakage position of said internal leakage from said transfer time of said pressure wave for said leakage flow path.

8. A leakage inspection device for detecting an internal leakage of a fluid flowing in an apparatus having a normal flow path defined by a plurality of sections, said leakage inspection device detecting the internal leakage in a deviated flow path from a section on the upstream side to a section on the downstream side of the normal flow path, said normal flow path having an inlet and an outlet, said device comprising:

pressure wave generating means for applying a pressure wave from said inlet to said normal flow path and said leakage flow path when said internal leakage occurs;

detecting means for detecting a first amplitude of said pressure wave, which passes through said normal flow path within said apparatus, at said outlet, and for detecting a second amplitude of said pressure wave, which passes through said leakage flow path within said apparatus when said internal leakage occurs, at said outlet; and internal leakage determining means for determining a quantity of said internal leakage fron said first amplitude and said second amplitude.

* * * * *